United States Patent
Huang

(10) Patent No.: US 12,166,519 B2
(45) Date of Patent: Dec. 10, 2024

(54) MULTIFUNCTIONAL STAND AND SUPPORT FOR MOBILE TERMINAL

(71) Applicants: Futaijing Precision Electronics (Yantai) Co., Ltd., Yantai (CN); HON HAI PRECISION INDUSTRY CO., LTD., New Taipei (TW)

(72) Inventor: Chiu-Chu Huang, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 385 days.

(21) Appl. No.: 17/752,025

(22) Filed: May 24, 2022

(65) Prior Publication Data

US 2023/0216533 A1 Jul. 6, 2023

(30) Foreign Application Priority Data

Dec. 30, 2021 (CN) .......................... 202123396479.X

(51) Int. Cl.
| | |
|---|---|
| *H04R 5/02* | (2006.01) |
| *G06F 1/16* | (2006.01) |
| *H04B 1/3877* | (2015.01) |
| *H04M 1/04* | (2006.01) |

(52) U.S. Cl.
CPC ......... *H04B 1/3877* (2013.01); *G06F 1/1632* (2013.01); *H04M 1/04* (2013.01); *H04R 5/02* (2013.01); *H04R 2205/021* (2013.01)

(58) Field of Classification Search
CPC .. H04R 5/02; H04R 2205/021; H04R 1/2861; H04R 1/345; H04M 1/04; H04M 1/035; H04M 1/21; H04B 1/3877; G06F 1/1632
See application file for complete search history.

(56) References Cited

U.S. PATENT DOCUMENTS

2020/0110576 A1* 4/2020 Krampf .................. H04L 67/10
2023/0405263 A1* 12/2023 Gartenberg .......... A61B 5/6892

* cited by examiner

*Primary Examiner* — Marcos L Torres
(74) *Attorney, Agent, or Firm* — ScienBiziP, P.C.

(57) ABSTRACT

A multifunctional mobile terminal stand and support device includes a base, a sound amplifying hole, and an atomization assembly. The base defines a first groove and a through hole, the base includes opposing first and second side surfaces, and the first groove is arranged on the first side surface. One end of the through hole is connected to the first groove, and other end of the through hole passes through the second side surface. The sound amplifying hole on one side of the base is connected to the first groove, and the second end of the sound amplifying hole passes through the base. The atomization assembly includes a mounting portion with second groove on the base and an atomizer, the atomizer is arranged in the second groove.

19 Claims, 5 Drawing Sheets

MULTIFUNCTIONAL STAND AND SUPPORT FOR MOBILE TERMINAL

TECHNICAL FIELD

The present disclosure relates to the field of support device, in particular to multifunctional mobile terminal support device.

BACKGROUND

Mobile phones are usually in the shape of a flat rectangle. In some occasions where users wish to view but not to hold mobile phones, the users need to place the mobile phone straight on a desktop. The mobile phone placed in such a position is hard to view the mobile phone screen, and the external playback effect of the mobile phone is also affected. One existing solution is to provide a mobile terminal bracket with a single purpose of supporting the mobile phone. However, such a mobile terminal bracket does not meet the composite needs in other scenarios.

Therefore, improvement is desired.

DETAILED DESCRIPTION

Figure 1:
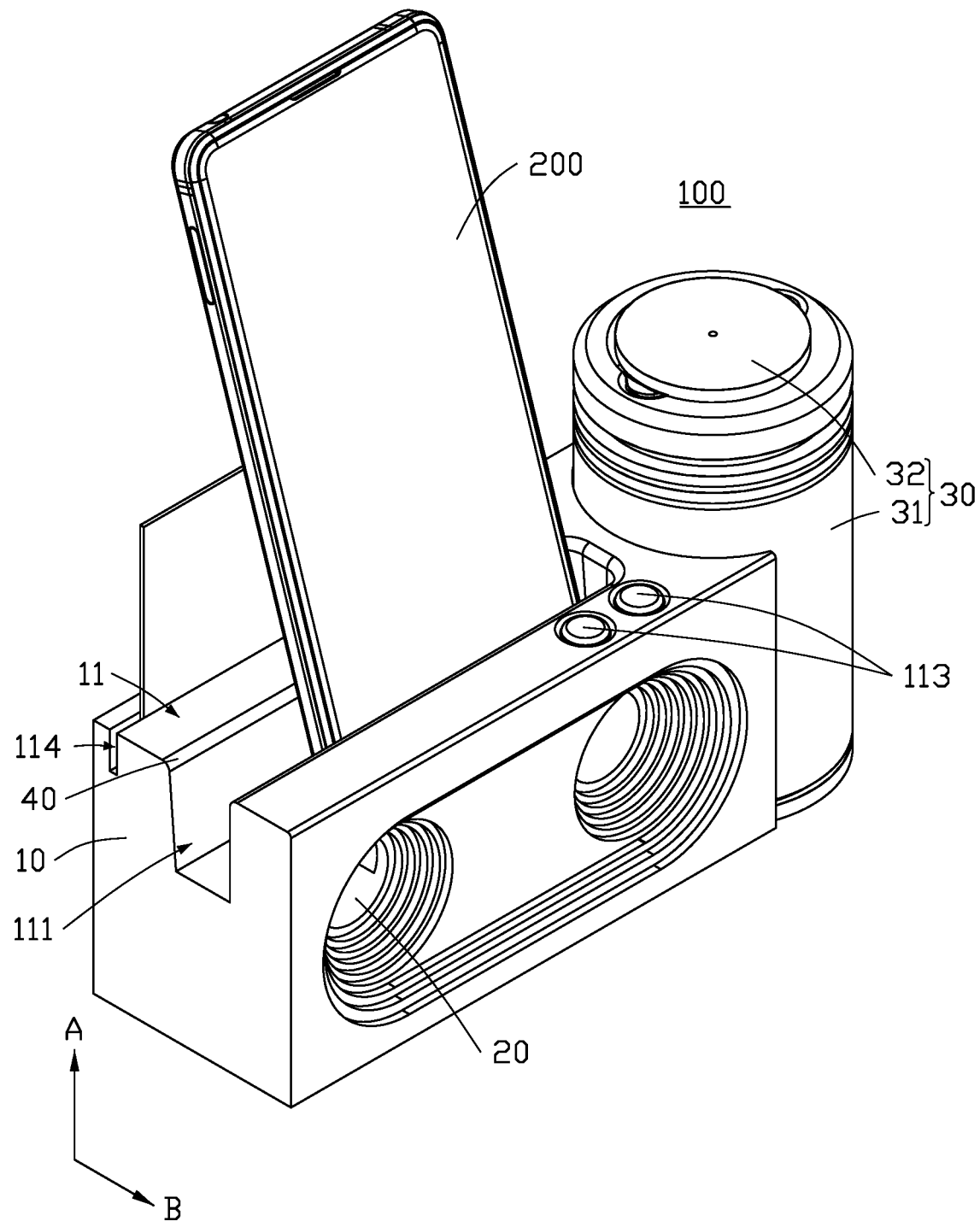
FIG. 1 is a schematic diagram of a multifunctional mobile terminal support device according to an embodiment of the present disclosure.

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

It should be noted that when a component is considered to "connect" another component, it can be directly connected to another component or there may be intermediate components at the same time. When a component is considered to be "disposed" on another component, it can be disposed directly on another component or there may be intervening components at the same time. The terms "top", "bottom", "top", "bottom", "left", "right", "front", "back" and similar expressions used in this paper are for illustrative purposes only.

The terms "first" and "second" are only used for descriptive purposes and cannot be understood as indicating or implying relative importance or implicitly indicating the number of indicated technical features. Thus, the features defining "first" and "second" may explicitly or implicitly include one or more of the features. In the description of the present disclosure, "multiple" means two or more, unless otherwise expressly and specifically defined.

The terms "installation" and "connection" should be understood in a broad sense. For example, it can be fixed connection, removable connection, or integrated connection. It can be mechanical or electrical connection. It can be directly connected or indirectly connected through an intermediate medium. It can be the connection within two elements or the interaction relationship between two elements.

In the present disclosure, unless otherwise expressly provided and limited, the first feature "above" or "below" of the second feature may include direct contact between the first and second features, or the first and second features may be not in direct contact. The first feature "above", "above" and "above" of the second feature, includes the first feature being directly above and obliquely above the second feature, or the horizontal height of the first feature being higher than that of the second feature. The first feature "below", "below" and "below" of the second feature, includes the first feature being directly above and obliquely above the second feature, or the horizontal height of the first feature being less than that of the second feature.

The following disclosure provides many different embodiments or examples to implement the different structures of the present disclosure. In order to simplify the disclosure of the present disclosure, the components and settings of specific examples are described below. Of course, they are merely examples and are not intended to limit the present disclosure.

FIGS. 1-4 illustrate a multifunctional mobile terminal support device 100 in accordance with an embodiment of the present disclosure.

Figure 4:
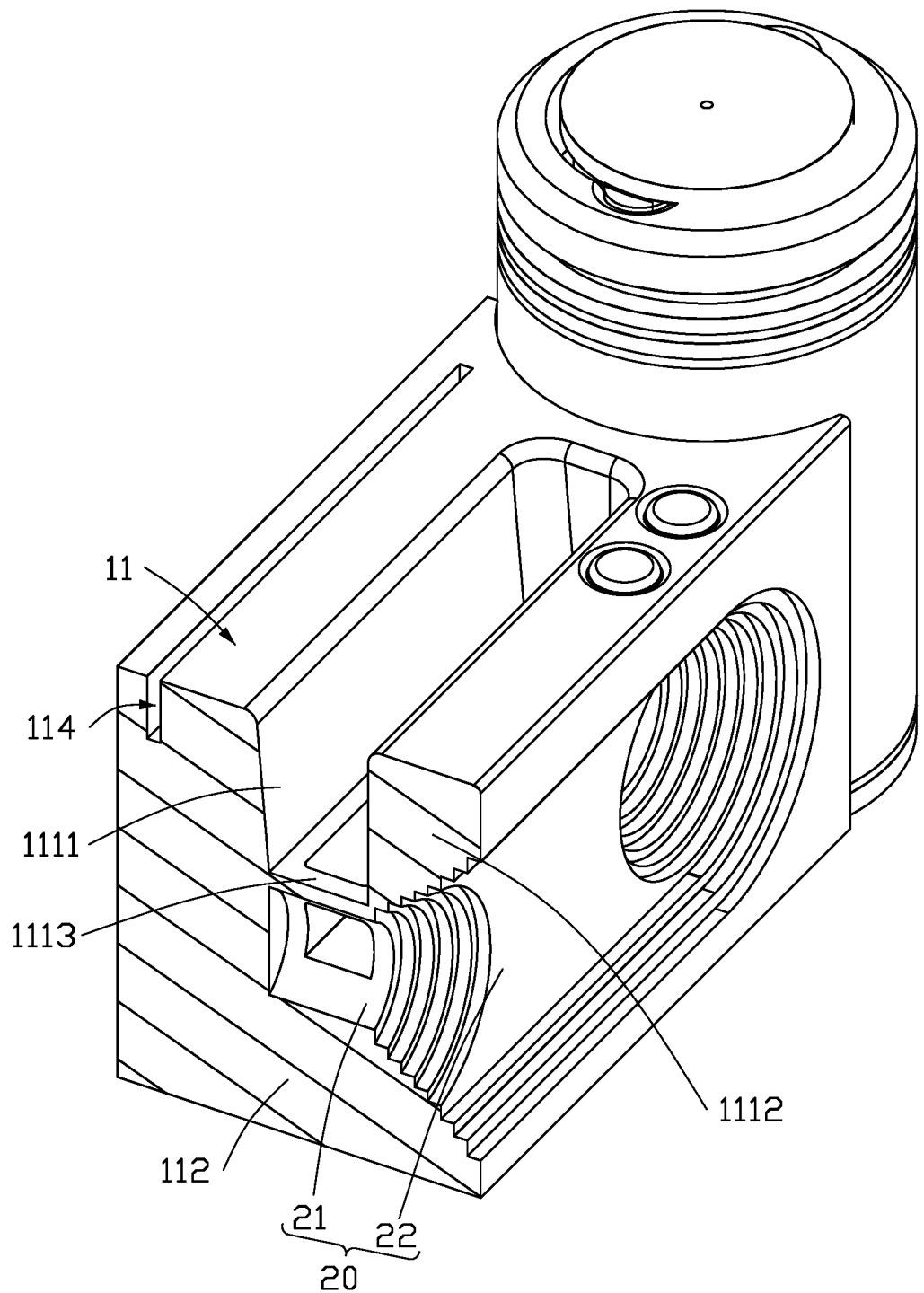
FIG. 4 is an internal sectional view of the multifunctional mobile terminal support device shown in FIG. 1.

The multifunctional mobile terminal support device 100 includes a base 10, a sound amplifying hole 20, and an atomization assembly 30. The base 10 defines a first groove 111 and a through hole 112 (shown in FIG. 3). Along the first direction A, the base 10 includes a first side surface 11 and a second side surface 12 (shown in FIG. 3) arranged opposite to each other. The first groove 111 is arranged on the first side surface 11. The through hole 112 communicates with the first groove 111 and passes through the second side surface 12. Along the first direction B, the sound amplifying hole 20 is arranged on one side of the base 10, and the sound amplifying hole 20 includes a relatively arranged first end 21 and a second end 22. The first end 21 communicates with the first groove 111, and the second end 22 penetrates the base 10. As shown in FIG. 4, the cross-sectional area of the second end 22 is greater than that of the first end 21. The second direction B is basically perpendicular to the first direction A. The atomization assembly 30 includes a mounting portion 31 and an atomizer 32. The mounting portion 31 is connected to one side of the base 10. The mounting portion 31 defines a second groove 312, and the atomizer 32 is arranged in the second groove 312.

Figure 2:
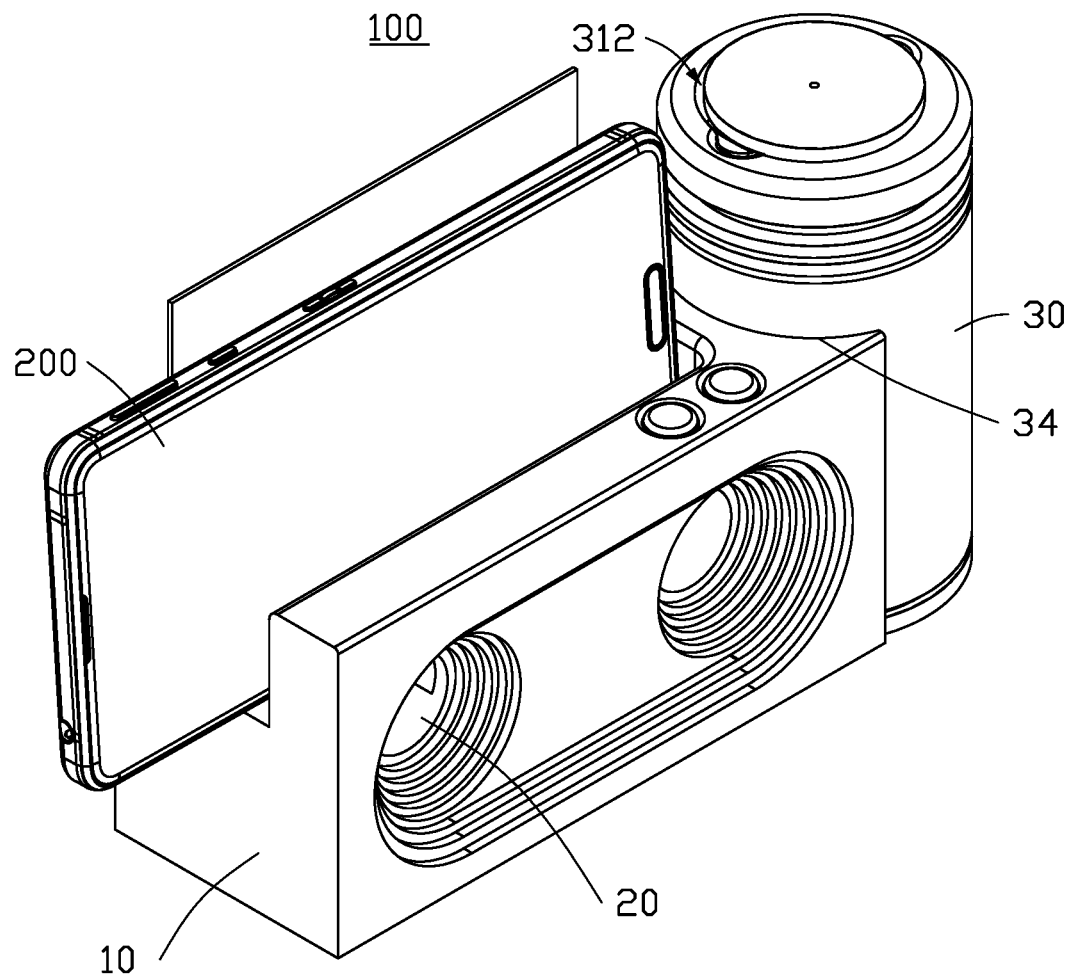
FIG. 2 is a schematic diagram of a multifunctional mobile terminal support device according to another embodiment of the present disclosure.
Figure 3:
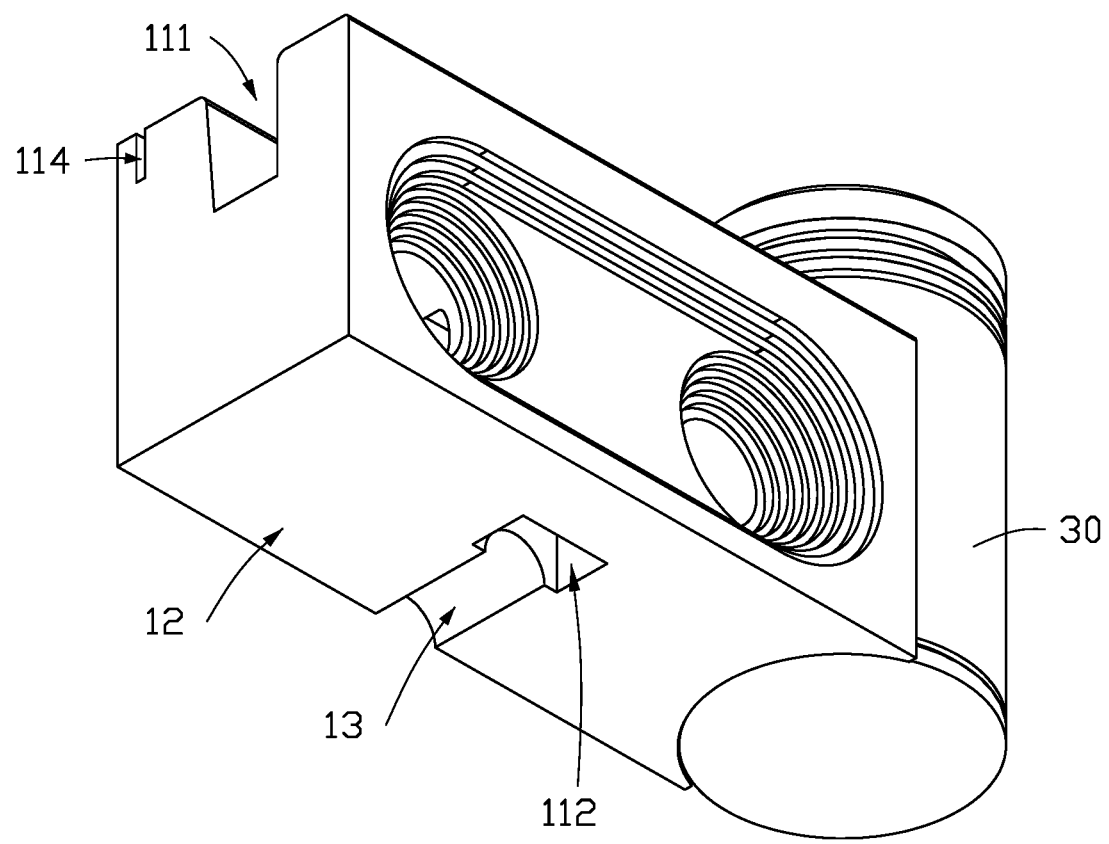
FIG. 3 is a schematic diagram of the multifunctional mobile terminal support device shown in FIG. 1, viewed from another perspective.

Referring to FIG. 2, in the embodiment, the first side surface 11 faces the top and the second side surface 12 faces the bottom. The opening of the first groove 111 is arranged on the first side surface 11, and the mobile terminal 200 can be placed vertically or horizontally in the first groove 111. The through hole 112 communicates with the bottom of the first groove 111 and passes through the second side surface 12. The through hole 112 is used to hold a battery-charging line, earphone line, data line, and other cables of the mobile terminal 200, so that the mobile terminal 200 can perform charging, data transmission, and other functions while installed on the multifunctional mobile terminal support device 100.

The sound amplifying hole 20 is arranged along the second direction B, the sound amplifying hole 20 is arranged on one side of the bottom of the first groove 111, and the first end 21 is connected to the bottom of the first groove 111, so that when the mobile terminal 200 is placed in the first groove 111, the speaker conventionally arranged at one end of the mobile terminal 200 is aligned with the first end 21 of the sound amplifying hole 20 to achieve sound amplification. The section of the second end 22 of the sound amplifying hole 20 is larger than that of the first end 21 to achieve the effect of amplifying.

The atomization assembly 30 is connected to one side of the base 10, and the atomizer 32 arranged in the mounting portion 31 is used to atomize a fragrance, diffuse the fragrance, and provide more functions for the terminal.

In one embodiment, the base 10 defines a third groove 114, the third groove 114 is opened on the first side surface 11 along the first direction A, as shown in FIG. 4, the cross-sectional area of the third groove 114 is less than that of the first groove 111. The third groove 114 is arranged adjacent to the first groove 111, and the third groove 114 is narrower than the first groove 111 for placing business cards, postcards, calendar cards, and other objects thinner than the mobile terminal 200.

Referring to FIG. 4, in one embodiment, the area of the sound amplifying hole 20 gradually increases along the direction extending from the first end 21 to the second end 22. In the embodiment, the diameter of the sound amplifying hole 20 gradually expands from the first end 21 to the second end 22, so as to realize the effect of expanding the sound of the first end 21 to the second end 22. This embodiment defines two sound amplifying holes 20, the two sound amplifying holes 20 are connected at the second end 22.

In one embodiment, a circular arcing surface 34 is arranged at the junction of the mounting portion 31 and the base 10. Since the atomizer 32 is largely cylindrical and the shape of the second groove 312 is set accordingly, setting the junction between the mounting portion 31 and the base 10 as the circular arcing surface 34 corresponding to the shape can effectively reduce the waste of space, and make the atomization assembly 30 more compact with the base 10.

In one embodiment, the multifunctional mobile terminal support device 100 includes a button 113, the button 113 is arranged on the first side surface 11, and the atomizer 32 is electrically connected to the button 113. The button 113 is used to start and stop the atomizer 32, which can improve the controllability of the atomizer 32 and the ease of use of the multifunctional mobile terminal support device 100.

Figure 5:
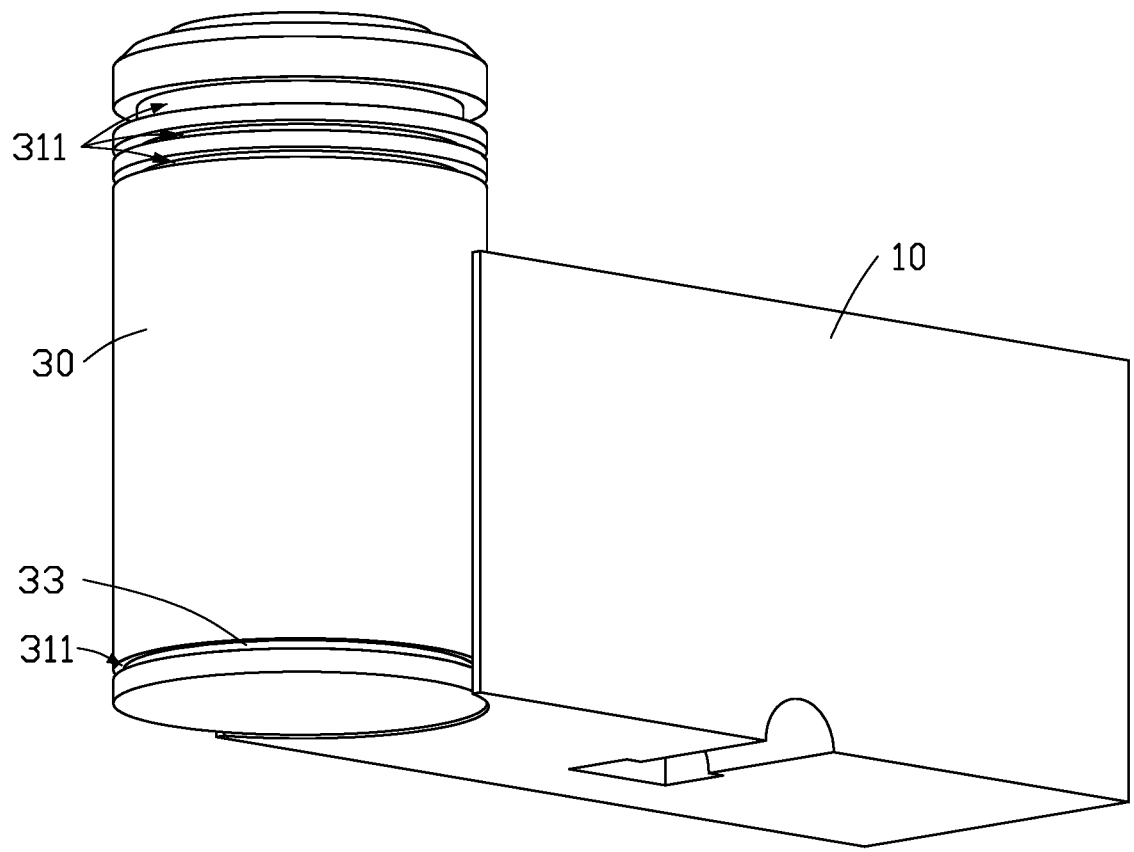
FIG. 5 is a schematic diagram of the multifunctional mobile terminal support device shown in FIG. 1, viewed from another perspective.

Referring to FIG. 5, in one embodiment, the mounting portion 31 defines an annular groove 311, the annular groove 311 is arranged around the circumference of the mounting portion 31. The annular groove 311 is arranged to facilitate grasping and clamping the mounting portion 31 by the user.

In one embodiment, the atomization assembly 30 also includes a lighting assembly 33, the lighting assembly 33 is embedded in the annular groove 311 to further improve the functionality of the multifunctional mobile terminal support device 100.

In one embodiment, the base 10 further defines a slot 13, the slot 13 is arranged on the second side surface 12 along the second direction B and communicates with the first groove 111. The slot 13 is used to hold the cable connecting the mobile terminal 200, so as to avoid the cable being compressed and cut by the base 10, and allow the base 10 to be placed squarely and stably. The cable is arranged along the slot 13 to connect the mobile terminal 200 with an external power supply or other device.

In one embodiment, a transition arcing surface 40 is arranged at the junction between the side wall of the first groove 111 and the first side surface 11. The junction is set as an arcing surface, which can avoid the damage to the mobile terminal 200 caused by the collision and contact between the base 10 and the mobile terminal 200, and reduce the risk of injury to the user.

In one embodiment, the first groove 111 has a first side wall 1111, a second side wall 1112, and a bottom wall 1113. The first side wall 1111 is arranged opposite to the second side wall 1112, and the bottom wall 1113 is connected between the first side wall 1111 and the second side wall 1112. An obtuse angle is formed between the first side wall 1111 and the bottom wall 1113 to create a slight inclination of the mobile terminal 200 during placement, so as to improve the stability of the mobile terminal 200 during placement and improve the safety of the multifunctional mobile terminal support device 100.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A multifunctional mobile terminal support device comprising:
    a base, wherein the base defines a first groove and a through hole, the base comprises a first side surface and a second side surface, the first side surface is opposite to the second side surface along a first direction, and the first groove is on the first side surface, one end of the through hole is connected to the first groove, and another end of the through hole extends through the second side surface;
    a sound amplifying hole on one side of the base in a second direction; wherein the sound amplifying hole has a first end and a second end opposite to each other, the first end is connected to the first groove, and the second end penetrates the base, a cross-sectional area of the second end is larger than a cross-sectional area of the first end, and the second direction is at an angle with the first direction; and
    an atomization assembly, wherein the atomization assembly comprises a mounting portion and an atomizer, the mounting portion is connected to the base, the mounting portion defines a second groove, and the atomizer is arranged in the second groove.

2. The multifunctional mobile terminal support device of claim 1, wherein the base further defines a third groove, the third groove is defined along the first direction, and a cross-sectional area of the third groove is less than a cross-sectional area of the first groove.

3. The multifunctional mobile terminal support device of claim 1, wherein a cross-sectional area of the sound amplifying hole gradually increases from the first end to the second end.

4. The multifunctional mobile terminal support device of claim 1, wherein a circular arcing surface is defined at a junction of the mounting portion and the base.

5. The multifunctional mobile terminal support device of claim 1, wherein the multifunctional mobile terminal support device further comprises a button, the button is arranged on the first side surface, and the atomizer is electrically connected to the button.

6. The multifunctional mobile terminal support device of claim 5, wherein the mounting portion defines an annular groove, and the annular groove is defined on a periphery of the mounting portion.

7. The multifunctional mobile terminal support device of claim 6, wherein the atomization assembly further comprises a lighting assembly, the lighting assembly is embedded in the annular groove.

8. The multifunctional mobile terminal support device of claim 1, wherein the base further defines a slot, the slot is arranged on the second side surface, the slot extends in the second direction and communicates with the first groove.

9. The multifunctional mobile terminal support device of claim 1, wherein a transition arcing surface is defined at a junction between a side wall of the first groove and the first side surface.

10. The multifunctional mobile terminal support device of claim 1, wherein the first groove defines a first side wall, a second side wall and a bottom wall, the first side wall is opposite to the second side wall, the bottom wall connects the first side wall and the second side wall, and an obtuse angle is defined between the first side wall and the bottom wall.

11. A multifunctional mobile terminal support device comprising:
   a base, wherein the base defines a first groove and a through hole, the base comprises a first side surface and a second side surface, the first side surface is opposite to the second side surface along a first direction, and the first groove is arranged on the first side surface, one end of the through hole is connected to the first groove, and another end of the through hole penetrates the second side surface;
   a sound amplifying hole arranged on one side of the base along a second direction; wherein the sound amplifying hole has a first end and a second end arranged opposite to each other, the first end is connected to the first groove, and the second end passes through the base, a cross-sectional area of the second end is larger than a cross-sectional area of the first end, and the second direction is arranged at an angle with the first direction; and
   an atomization assembly, wherein the atomization assembly comprises a mounting portion and an atomizer, the mounting portion is connected to the base, the mounting portion defines a second groove, and the atomizer is arranged in the second groove;
   wherein a transition arcing surface is arranged at a junction between a side wall of the first groove and the first side surface.

12. The multifunctional mobile terminal support device of claim 11, wherein the base defines a third groove, the third groove is defined along the first direction, and a cross-sectional area of the third groove is less than a cross-sectional area of the first groove.

13. The multifunctional mobile terminal support device of claim 11, wherein a cross-sectional area of the sound amplifying hole gradually increases from the first end to the second end.

14. The multifunctional mobile terminal support device of claim 11, wherein a circular arcing surface is arranged at a junction of the mounting portion and the base.

15. The multifunctional mobile terminal support device of claim 11, wherein the multifunctional mobile terminal support device further comprises a button, the button is arranged on the first side surface, and the atomizer is electrically connected to the button.

16. The multifunctional mobile terminal support device of claim 15, wherein the mounting portion defines an annular groove, and the annular groove is defined on a periphery of the mounting portion.

17. The multifunctional mobile terminal support device of claim 16, wherein the atomization assembly further comprises a lighting assembly, the lighting assembly is embedded in the annular groove.

18. The multifunctional mobile terminal support device of claim 11, wherein the base further defines a slot, the slot is arranged on the second side surface along the second direction and communicated with the first groove.

19. The multifunctional mobile terminal support device of claim 11, wherein the first groove is provided with a first side wall, a second side wall and a bottom wall, the first side wall is arranged opposite to the second side wall, the bottom wall is connected between the first side wall and the second side wall, and an obtuse angle is formed between the first side wall and the bottom wall.

* * * * *